United States Patent Office 3,152,124
Patented Oct. 6, 1964

3,152,124
1,3-DIAZAPHENOTHIAZINES
Arthur P. Phillips, Tuckahoe, and Nariman B. Mehta, Valhalla, N.Y., assignors to Burroughs Wellcome & Co. (U.S.A.) Inc., Tuckahoe, N.Y., a corporation of New York
No Drawing. Filed July 31, 1961, Ser. No. 127,813
Claims priority, application Great Britain Aug. 12, 1960
5 Claims. (Cl. 260—243)

This invention relates to heterocyclic compounds and their manufacture.

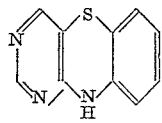
(I)

Derivatives of the ring system of 1,3-diazaphenothiazine (I) are of considerable potential value, being related both to the physiologically active derivatives of phenothiazine and to biologically important fused-ring pyrimidines such as purines, alloxazines and pteridines. The diazaphenothiazines so far investigated have marked antibacterial action against a number of pathogenic microorganisms including *Streptococcus faecalis, Escherichia coli, Staphylococcus aureus, Proteus vulgaris* and *Pseudomonas aeruginosa*.

Our preparation of diazaphenothiazines involves reaction of o-aminothiophenol (II) with 2,4-diamino-5-halogeno-6-chloropyrimidine (III) in the sense shown to give 2,4-diamino-1,3-diazaphenothiazine (IV), as shown:

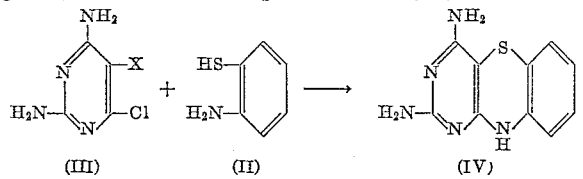

In Formula III, X is chlorine or bromine, preferably the latter. It should be realized that in pyrimidines, the 6-position is very reactive whereas the 5-position is much less so. Usually halogens in this position undergo useful displacement reactions only under very favorable circumstances or conditions. Of the functional groups in (II), the SH is extremely reactive under alkaline conditions (actually as —S⁻). The problem is therefore, not only to accomplish a cyclization but also to accomplish it unilaterally in the direction desired.

In fact we have found two alternative sets of conditions for this reaction. While apparently different mechanisms should be involved, the key condition is the same and since we are by no means certain of the finer interpretations in chemical theory, we regard these methods, employing the same starting materials and the same key step, as differing aspects of the same process.

In the first variant, (III) and (II) are warmed together under acid conditions. (Initially a few drops of concentrated acid are added giving a starting pH of about 4. During the reaction more acid is formed so that the final pH could be 2 or even less.) These conditions are expected to favor reaction of the amino group of (II) at the 6-position of (III). In principle therefore, the intermediate (V) should be formed.

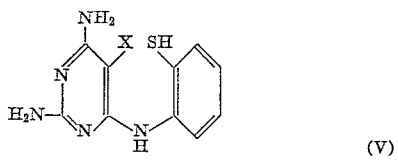
(V)

However, this cannot be isolated: on basification there is precipitated not (V) but (IV) and in excellent yield. It is consequently uncertain whether the cyclization is completed instantaneously on basification of the reaction-mixture, or more gradually while still acid. In this process either 2,4-diamino-5-bromo-6-chloropyrimidine (III, X=Br) or 2,4-diamino-5,6-dichloropyrimidine (III, X=Cl) may be used but the bromo compound gives about twice as large a yield.

The second variant of our synthesis is applicable only to 2,4-diamino-5-bromo-6-chloropyrimidine. In this route, the initial reaction between (II) and (III) is conducted under alkaline conditions and produces the intermediate (VI), which is, of course, an isomer of the hypothetical (V).

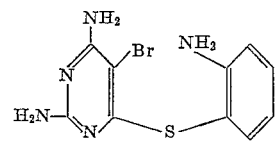
(VI)

When (III) is heated in alcohol in the presence of acid it presumably rearranges to (V) (by a process akin to the known Smiles rearrangement) and then cyclizes. The same product is thus obtained by both variations of our method and in comparable yields.

The following examples illustrate the invention. Temperatures are in degrees Celsius.

EXAMPLE 1

*2,4-Diamino-5-Bromo-6-Chloropyrimidine*

15 g. (0.1 M) 2,4-diamino-6-chloropyrimidine (M.P. 202°) was dissolved in 300 ml. 50% aqueous methanol. 10 g. sodium bicarbonate was added. The mixture was stirred rapidly and 16 g. bromine in 50 ml. methanol was added dropwise over a period of 30 minutes. When half the bromine had been added, 5 g. sodium bicarbonate was added to the reaction mixture. It was stirred for a total duration of 1.5 hours. The flocculent precipitate was filtered off and washed with water. It was recrystallized from boiling water to give 14 g. 2,4-diamino-5-bromo-6-chloropyrimidine (62% yield), M.P. 217°.

EXAMPLE 2

*2,4-Diamino-1,3-diazaphenothiazine*

A mixture of 2.3 g. (0.01 M) 2,4-diamino-5-bromo-6-chloropyrimidine, 100 ml. hot water, 1.5 g. (0.012 M) o-aminobenzenethiol and a few drops of concentrated hydrochloric acid was heated for 1–2 hours at 100°. A clear yellow solution resulted within 15–30 minutes. After cooling, a slight turbid oily material was removed by filtration, and the product was precipitated when the clear filtrate was brought to pH 8–10 by the addition of ammonia. Immediately before neutralization, the solution had an absorption peak at 358 mμ, which vanished on neutralization and was not displayed by the isolated product either as the free base or as its cation. After crystallization of the crude moist product from acetone, 2.1 g. 2,4-diamino-1,3-diazaphenothiazine (90% yield) was obtained as yellow crystals melting at 255–256°.

EXAMPLE 3

*2,4-Diamino-6-o-Aminophenylthio-5-Bromopyrimidine*

2.3 g. (0.01 M) 2,4-diamino-5-bromo-6-chloropyrimidine was added to a solution of 1.5 g. (0.012 M) o-aminobenzenethiol in 80 ml. ethanol containing 4 ml. triethylamine. The mixture was heated for 1–2 hours on the steam bath. Ethanol and triethylamine were removed by evaporation. The residue was washed first with ether and then with water to remove any triethylamine hydrochloride. The product, 2.7 g. 2,4-diamino-6-o-aminophenylthio-5-bromopyrimidine (90% yield), was crystallized as fluffy white crystals from methanol or ethanol and melted at 175–176°.

EXAMPLE 4

*2,4-Diamino-1,3-Diazaphenothiazine Hydrochloride*

A suspension of 7 g. (0.0224 M) 2,4-diamino-6-o- aminophenylthio-5-bromopyrimidine in 100 ml. ethanol was brought to pH 1–2 by addition of ethanolic hydrogen chloride. After heating on a steam bath for 10–20 minutes, the original pure white crystalline solid had dissolved to give first a clear deep yellow solution and then a deep yellow crystalline precipitate. This was collected and recrystallized from methanol to give 5.7 g. 2,4-diamino-1,3-diazaphenothiazine hydrochloride (95% yield), M.P. 330–335° (decomp.). This hydrochloride, on solution and neutralization, afforded a base identical with that obtained in Example 2.

EXAMPLE 5

One hundredth mole (1.8 g.) of 2,4-diamino-5,6-dichloropyrimidine and 1.5 g. (0.012 mole) of o-mercaptoaniline were dissolved in 50 cc. of water and 2 cc. of concentrated hydrochloric acid. The solution was heated two hours on the steam-bath, giving a clear yellow solution. The reaction-mixture was basified with aqueous ammonia to pH 10 whereupon a pasty yellow solid precipitated. This was recrystallized from acetone giving 1.6 g. of a yellow solid, M.P. 246–249°, in two crops. A second crystallization from acetone afforded a product melting at 255–256°, identical with that described in Example 2.

What we claim is:

1. A method of preparing 2,4-diamino-1,3-diazaphenothiazine which comprises heating in a solvent selected from the class consisting of water and the lower alcohols at a temperature not substantially above 100° and under acid conditions a compound selected from the class consisting of (A) 2,4-diamino-5-bromo-6-(o-aminophenylmercapto)pyrimidine, (B) 2,4-diamino-5-bromo-6-chloropyrimidine and o-aminothiophenol, and (C) 2,4-diamino-5,6-dichloropyrimidine and o-aminothiophenol, and recovering from the reaction-mixture the 2,4-diamino-1,3-diazaphenothiazine formed.

2. A method of preparing 2,4-diamino-1,3-diazaphenothiazine which comprises heating, in a solvent selected from the class consisting of water and the lower alcohols at a temperature not substantially above 100° and under acid conditions, 2,4-diamino-5-bromo-6-(o-aminophenylmercapto)pyrimidine and recovering from the reaction-mixture the 2,4-diamino-1,3-diazaphenothiazine formed.

3. A method of preparing 2,4-diamino-1,3-diazaphenothiazine which comprises heating in a solvent selected from the class consisting of water and the lower alcohols at a temperature not substantially above 100° and under acid conditions, 2,4-diamino-5-bromo-6-chloropyrimidine and o-aminothiophenol and recovering from the reaction-mixture the 2,4-diamino-1,3-diazaphenothiazine formed.

4. A method of preparing 2,4-diamino-1,3-diazaphenothiazine which comprises heating, in a solvent selected from the class consisting of water and the lower alcohols at a temperature not substantially above 100° and under acid conditions, 2,4-diamino-5,6-dichloropyrimidine and o-aminothiophenol and recovering from the reaction-mixture the 2,4-diamino-1,3-diazaphenothiazine formed.

5. A method of preparing 2,4-diamino-1,3-diazaphenothiazine which comprises heating in a hydroxylic solvent having a boiling point not over 100° and containing dilute mineral acid, at a temperature in the neighborhood of the boiling point of the solvent, a compound selected from the class consisting of (A) 2,4-diamino-5-bromo-6-(o-aminophenylmercapto)pyrimidine, (B) 2,4-diamino-5-bromo-6-chloropyrimidine and o-aminothiophenol, and (C) 2,4-diamino-5,6-dichloropyrimidine and o-aminothiophenol, and recovering from the reaction-mixture the 2,4-diamino-1,3,-diazaphenothiazine formed.

References Cited in the file of this patent

FOREIGN PATENTS

| 549,055 | Belgium | Dec. 27, 1956 |
| 848,737 | Great Britain | Sept. 21, 1960 |
| 1,110,651 | Germany | July 13, 1961 |

OTHER REFERENCES

Rose: J. Chem. Soc., 1952, pages 3451–2.
Druey: Angew. Chem., vol. 70, pages 10–11 (1958).